(12) United States Patent
Liu et al.

(10) Patent No.: US 11,294,818 B2
(45) Date of Patent: Apr. 5, 2022

(54) METHOD, ELECTRONIC DEVICE AND COMPUTER PROGRAM PRODUCT FOR DATA STORAGE

(71) Applicant: EMC IP Holding Company LLC, Hopkinton, MA (US)

(72) Inventors: Yousheng Liu, Beijing (CN); Geng Han, Beijing (CN); Jian Gao, Beijing (CN); Ruiyong Jia, Beijing (CN); Jianbin Kang, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 132 days.

(21) Appl. No.: 16/575,479

(22) Filed: Sep. 19, 2019

(65) Prior Publication Data

US 2020/0133869 A1    Apr. 30, 2020

(30) Foreign Application Priority Data

Oct. 31, 2018  (CN) .......................... 201811286058.1

(51) Int. Cl.
*G06F 12/0882* (2016.01)
*G06F 12/0811* (2016.01)
*G06F 3/06* (2006.01)
*G06F 9/54* (2006.01)

(52) U.S. Cl.
CPC .......... *G06F 12/0882* (2013.01); *G06F 3/065* (2013.01); *G06F 3/0607* (2013.01); *G06F 3/0656* (2013.01); *G06F 3/0685* (2013.01); *G06F 9/544* (2013.01); *G06F 12/0811* (2013.01)

(58) Field of Classification Search
None
See application file for complete search history.

(56) References Cited

U.S. PATENT DOCUMENTS

| | | | |
|---|---|---|---|
| 6,941,396 B1 * | 9/2005 | Thorpe | G06F 3/0613 707/999.202 |
| 7,809,975 B2 | 10/2010 | French et al. | |
| 8,661,169 B2 * | 2/2014 | Rabinovitch | G06F 12/0862 710/52 |
| 8,904,229 B1 | 12/2014 | Veeraswamy et al. | |
| 9,053,027 B1 * | 6/2015 | Harvey | G06F 11/14 |
| 10,261,908 B2 | 4/2019 | Li et al. | |
| 10,372,463 B1 | 8/2019 | Twomey et al. | |
| 10,545,668 B2 | 1/2020 | Feng et al. | |
| 10,552,322 B2 | 2/2020 | Hu et al. | |
| 10,585,594 B1 | 3/2020 | Armangau et al. | |
| 10,740,187 B1 | 8/2020 | Prabhakar et al. | |
| 10,824,359 B2 | 11/2020 | Armangau et al. | |

(Continued)

*Primary Examiner* — Charles Rones
*Assistant Examiner* — Ryan Dare
(74) *Attorney, Agent, or Firm* — BainwoodHuang

(57) ABSTRACT

Techniques perform data storage. Such techniques may involve writing metadata to a first cache of a first processor, the metadata indicating allocation of a storage resource to user data. Such techniques may further involve determining an address range of the metadata in the first cache. Such techniques may further involve copying only data stored in the address range in the first cache to a second cache of a second processor. Accordingly, the data transmission volume between two processors is reduced, which helps to improve the overall performance of a storage system.

27 Claims, 7 Drawing Sheets

(56) References Cited

U.S. PATENT DOCUMENTS

| | | | |
|---|---|---|---|
| 10,936,499 B2 | 3/2021 | Jia et al. | |
| 2011/0225370 A1* | 9/2011 | So | G06F 12/0868 711/135 |
| 2012/0066456 A1* | 3/2012 | Rabinovitch | G06F 12/0862 711/137 |
| 2020/0133507 A1* | 4/2020 | Liu | G06F 3/0635 |

* cited by examiner

METHOD, ELECTRONIC DEVICE AND COMPUTER PROGRAM PRODUCT FOR DATA STORAGE

CROSS-REFERENCE TO RELATED APPLICATION

This application claims priority to Chinese Patent Application No. CN201811286058.1, on file at the China National Intellectual Property Administration (CNIPA), having a filing date of Oct. 31, 2018, and having "METHOD, ELECTRONIC DEVICE AND COMPUTER PROGRAM PRODUCT FOR DATA STORAGE" as a title, the contents and teachings of which are herein incorporated by reference in their entirety.

FIELD

Embodiments of the present disclosure relate to the field of data storage, and more specifically, to methods, electronic devices and computer program products for data storage.

BACKGROUND

In common storage devices, the computing capability and input/output (IO) throughput of a storage product are usually improved by using a system architecture where multiple storage processors (SPs, also referred to as controllers) are attached to a shared storage disk. The multiple storage processors are connected through an internal communication interface and synchronize or mirror data by using the internal communication interface. Data synchronization or mirroring between different storage processors is usually taken at the granularity of data block (e.g., cache page).

When receiving user data from an upper layer, the storage processor also needs to update its cached metadata and synchronize or mirror the updated metadata to another storage processor (i.e., the peer storage processor) at the granularity of for example cache page. Even when only a small part of data in the cache page is updated, data in the whole cache page still have to be sent to the peer storage processor. This wastes communication resources between the storage processors and becomes a bottleneck for improvement of the storage system performance.

SUMMARY

Embodiments of the present disclosure provide a solution for data storage.

In a first aspect of the present disclosure, there is provided a method for data storage. The method includes writing metadata to a first cache of a first processor, the metadata indicating allocation of a storage resource to user data. The method further includes determining an address range of the metadata in the first cache. The method further includes copying only data stored in the address range in the first cache to a second cache of a second processor.

In a second aspect of the present disclosure, there is provided a method for data storage. The method includes receiving from a first processor data stored in a first cache of the first processor, the received data being stored within a first address range of metadata in the first cache, the metadata indicating allocation of a storage resource to user data. The method further includes determining a second address range of the received data in a second cache of a second processor based on the first address range of the metadata. The method further includes writing the received data to the second cache based on the second address range.

In a third aspect of the present disclosure, there is provided an electronic device. The electronic device includes a processor and a memory coupled to the processor, the memory having instructions stored therein, the instructions, when executed by the processor, causing the electronic device to perform acts. The acts include: writing metadata to a first cache of a first processor, the metadata indicating allocation of a storage resource to user data; determining an address range of the metadata in the first cache; and copying only data stored in the address range in the first cache to a second cache of a second processor.

In a fourth aspect of the present disclosure, there is provided an electronic device. The electronic device includes a processor and a memory coupled to the processor, the memory having instructions stored therein, the instructions, when executed by the processor, causing the electronic device to perform acts. The acts include: receiving from a first processor data stored in a first cache of the first processor, the received data being stored in a first address range of metadata in the first cache, the metadata indicating allocation of a storage resource to user data; determining a second address range of the received data in a second cache of a second processor based on the first address range of the metadata; and writing the received data to the second cache based on the second address range.

In a fifth aspect of the present disclosure, there is provided a computer program product. The computer program product is tangibly stored on a computer readable medium and includes machine executable instructions which, when executed, cause the machine to perform a method according to the first aspect of the present disclosure.

In a sixth aspect of the present disclosure, there is provided a computer program product. The computer program product is tangibly stored on a computer readable medium and includes machine executable instructions which, when executed, cause the machine to perform a method according to the second aspect of the present disclosure.

The Summary is provided to introduce a selection of concepts in a simplified form that are further described below in the Detailed Description. This Summary is not intended to identify key features or essential features of the present disclosure, nor is it intended to be used to limit the scope of the present disclosure.

BRIEF DESCRIPTION OF THE DRAWINGS

The above and other objectives, features, and advantages of the present disclosure will become more apparent through the following more detailed description of the example embodiments of the present disclosure with reference to the accompanying drawings, wherein the same reference sign generally refers to the like element in the example embodiments of the present disclosure.

DETAILED DESCRIPTION OF EMBODIMENTS

Figure 1:
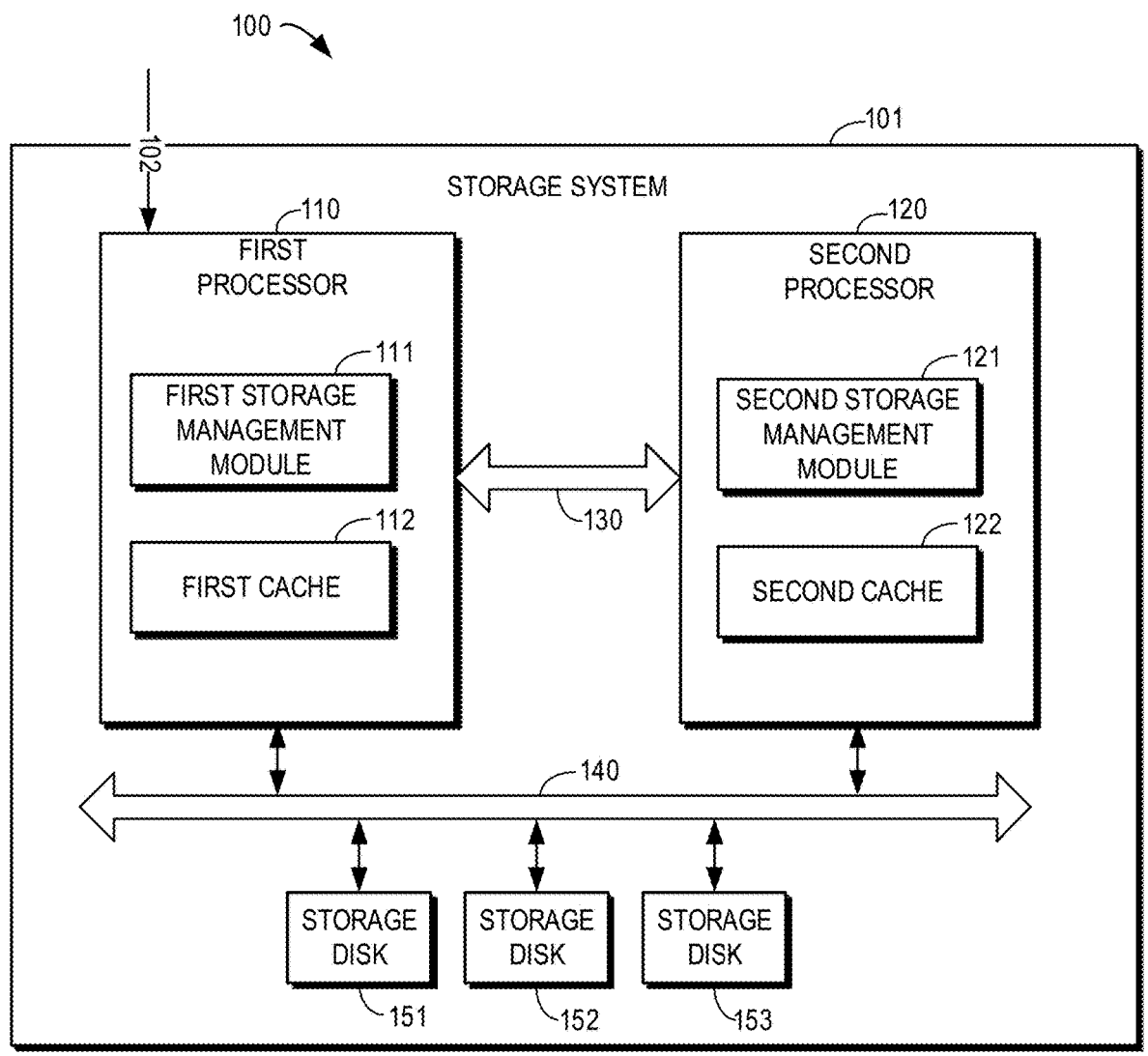
FIG. 1 shows a schematic diagram of an example environment in which embodiments of the present disclosure can be implemented.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

Principles of the present disclosure will now be described with reference to several example embodiments illustrated in the drawings. Although some preferred embodiments of the present disclosure are shown in the drawings, it would be appreciated that description of those embodiments is merely for the purpose of enabling those skilled in the art to better understand and further implement the present disclosure and is not intended for limiting the scope disclosed herein in any manner.

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The terms "an example embodiment" and "an embodiment" are to be read as "at least one example embodiment." The term "another embodiment" is to be read as "at least one further embodiment." The terms "first", "second" and so on can refer to same or different objects. Other definitions, either explicit or implicit, may be included below.

FIG. 1 shows a schematic diagram of an example environment 100 in which embodiments of the present disclosure may be implemented. A dual controller storage system 101 as shown in FIG. 1 may communicate via a front end bus (not shown) with a host on which application software runs, so as to provide data storage service to the host (not shown). The host may issue a write request 102 to the storage system 101 via the front end bus.

As shown in FIG. 1, the dual controller storage system 101 includes two storage processors 110 and 120 providing storage service to the host, which are also called controllers. For the sake of discussion, the two storage processors are hereinafter referred to as the first processor 110 and the second processor 120 respectively. The first processor 110 and the second processor 120 are connected to each other through an internal communication interface 130 (e.g., communication manager interface CMI). With the internal communication interface 130, the first processor 110 and the second processor 120 may synchronize data and inner status with each other.

At the back end, storage disks 151-153 are connected to the two processors 110 and 120 through a backend bus 140. The storage disks 151-153 may be any non-volatile storage media that are currently known or to be developed in future, such as disks, solid state disks (SSDs), disk arrays, etc. It should be understood that although FIG. 1 illustrates three storage disks 151-153, this is merely illustrative and not intended to limit the scope of the present disclosure, and the storage system 101 may include any appropriate number of storage disks.

Storage system software runs on each of the processors 110 and 120. In each of the processors 110 and 120, there are several different functional modules which provide different storage services in the storage system. FIG. 1 shows a first storage management module 111 and a first cache 112 in the first processor 110. The first storage management module 111 may be used to provide and manage a user logical unit number (LUN) and to manage metadata related to user data. The first cache 112 may be used to provide data caching services to the storage system 101. Data may be temporarily stored in the first cache 112 and will be flushed to the backend disks 151-153 later.

A second management module 121 and a second cache 122 in the second processor 120 are similar to the first management module 111 and the first cache 112 respectively. Data cached in the first cache 112 and the second cache 122 may be mirrored between the two processors 110 and 120 through the internal communication interface 130. In embodiments of the present disclosure, the first cache 112 and the second cache 122 may include a dynamic random access memory cache (DRAM cache). Note that the first cache 112 and the second cache 122 herein may include both a memory for temporarily storing data and a functional module for managing the memory.

In addition to the storage management modules and caches shown in FIG. 1, the processors 110 and 120 may further include other modules, such as a host module for interfacing with the host, a Redundant Array of Independent Disks (RAID) module for providing a RAID interface, a drive module for driving the storage disks 151-153, etc. Herein, for the storage management modules 111, 121 and the caches 112, 122, the host module is an upper-layer module, and the RAID module and the drive module are lower-layer modules. These modules in the processors 110 and 120 may communicate with the same modules in the peer processer (each of the first processor 110 and the second processor 120 is the peer processor of the other) through the internal communication interface 130.

As mentioned above, when the host has user data to be written to the storage system 101, it may issue the write request 102 to the storage system 101. After receiving the write request 102, the host module in the storage system 101 forwards the write request 102 to a lower-layer module in the storage system 101, e.g. to the first storage management module 111.

The first storage management module 111 when processing the write request 102 may update its metadata and such operation will generate an internal write request to the first cache 112. Thus, the first storage management module 111 will issue a metadata write request and a user data write request to the first cache 112.

Conventionally, a cache provides an interface to a storage management module of upper-layer at the granularity of data block (e.g., cache page). After the storage management module writes data to the cache, the cache mirrors the written data including internal metadata and user data to a cache of the peer processor. After mirroring the written data to the peer processor, the cache will notify the storage management module of the completion of writing. At this point, the written data is stored in the cache module and will be flushed to a backend storage disk at a proper time according to the flushing strategy.

However, in such conventional implementation, even when only a small part of data (metadata) in the cache page has been modified, data stored in the whole cache page still has to be mirrored to the peer processor. When the cached data is mirrored through the internal communication interface, data is transmitted to the cache of the peer processor through the direct memory access (DMA) operation.

Such an approach wastes lots of internal communication resources. In many storage systems, the internal communication interface (e.g., CMI) is the bottleneck of performance. If the workload of the internal communication interface can be lightened by optimizing the mirror of metadata, then the internal communication interface will have more ability to mirror user data, and the system performance may therefore be improved.

According to embodiments of the present disclosure, there is provided a solution for mirroring metadata. In the solution, when metadata is written to a cache, a processor identifies an address range of the written metadata in the cache and copies data stored in the address range to a peer processor, rather than replicating the whole cache page including the written metadata to the peer processor. In this way, internal communication resources used in mirroring metadata are reduced, thereby improving the storage system performance.

Figure 2:
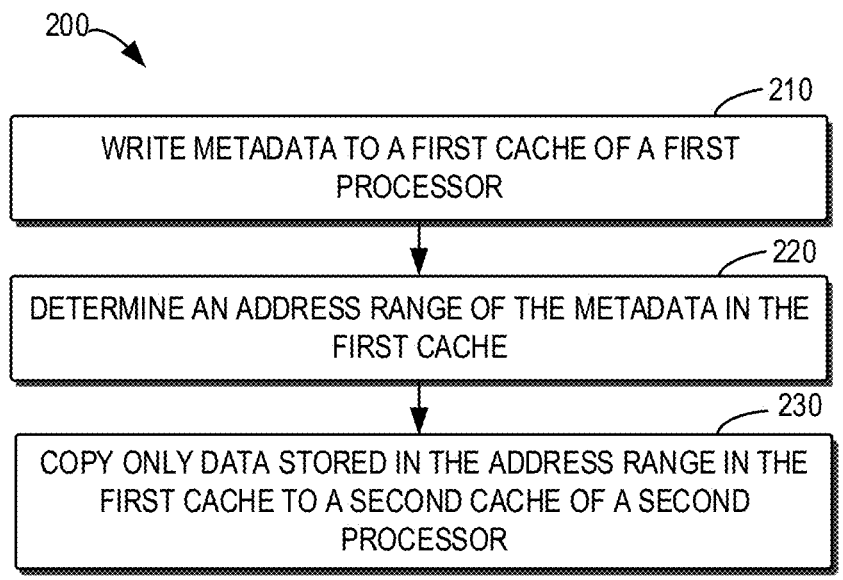
FIG. 2 shows a flowchart of a process of mirroring metadata according to some embodiments of the present disclosure.

Embodiments of the present disclosure are described below in detail with reference to the accompanying drawings. FIG. 2 shows a flowchart of a process 200 of mirroring metadata according to some embodiments of the present disclosure. The process 200 may be implemented by a storage processor/controller of a storage system, in particular by a storage management module and a cache module in the storage processor. For the sake of discussion, the process 200 is described in conjunction with FIG. 1. In such an example, the process 200 may be implemented at the first processor 110, and some steps of the process 200 may be performed by the first storage management module 111, while others may be performed by the first cache 112.

As mentioned above, when the first processor 110 receives user data, it needs to update corresponding metadata stored therein. The first cache 112 allocates a cache space or finds an allocated cache space for the metadata to be written or to be modified. For example, the first storage management module 111 issues a write request (e.g., a write request of data copy avoid DCA) to the first cache 112. The first cache 112 finds the corresponding cache space (e.g., cache page) from a cache pool and sends information on the cache space to the first storage management module 111.

At block 210, the first storage management module 111 writes metadata to the first cache 112 of the first processor 110. The metadata may be used to indicate allocation of storage resources (e.g., resources in the storage disks 151-153) to the received user data. For example, the metadata may indicate to which user logical unit number a disk slice of the storage disks 151-153 is allocated.

The first storage management module 111 may write the metadata to a cache page (also abbreviated as a page herein) of the first cache 112. In some embodiments, transactional write may be implemented by taking two physical pages as one transactional page. The transactional write will be described below in detail with reference to FIGS. 4-6.

In the case where the cache page (or transactional page) is invalid, there is no old data in the cache page, and the first storage management module 11 will fill the whole page. In the case where the cache page (or transactional page) is dirty or clean, there is old data in the cache page, and the first storage management module 111 only needs to modify part of data already stored in the cache page.

At block 220, the first storage management module 111 determines an address range of the metadata in the first cache 112. For example, the address range for the metadata may be indicated by an offset of the metadata in the cache page relative to a page address.

Figure 3A:
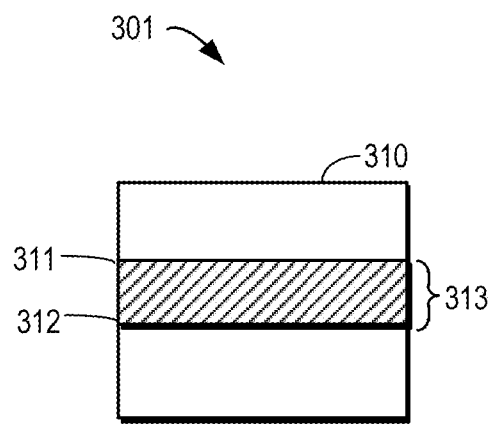
FIG. 3A shows a schematic diagram of metadata continuously written to a first cache according to some embodiments of the present disclosure.

The metadata may be continuously or discontinuously written to the first cache 112. FIG. 3A shows a schematic diagram 301 of the metadata continuously written to the first cache 112 according to some embodiments of the present disclosure. As shown in FIG. 3A, the metadata is continuously written to a page 310 of the first cache 112. In this case, the address range 313 of the metadata in the first cache 112 is defined by a start address 311 and an end address 312 for the metadata. The start address 311 and the end address 312 may be physical addresses in the first cache 112 or may be offsets relative to the address of the page 310.

Figure 3B:
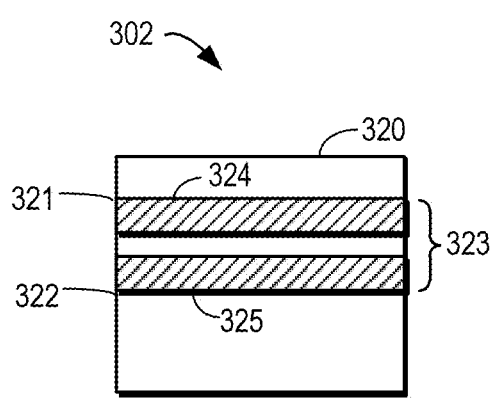
FIG. 3B shows a schematic diagram of metadata discontinuously written to a first cache according to some other embodiments of the present disclosure.

FIG. 3B shows a schematic diagram 302 of the metadata discontinuously written to the first cache 112 in some other embodiments of the present disclosure. As shown in FIG. 3B, the metadata is discontinuously written to a page 320 of the first cache 112. In this case, an address range 323 of the metadata in the first cache 112 are defined by a start address 321 that is closer to the start of the page 320 and an end address 322 that is closer to the end of the page 320. Similarly, the start address 321 and the end address 322 may be physical addresses in the first cache 112 or may be offsets relative to the address of the page 320.

The first storage management module 111 may tag the portion, which includes the metadata, of the first cache 112. For example, the first storage management module 111 may tag the address range 313 or 323 and notify the address range 313 or 323 to the first cache 112.

At block 230, the first processor 110 only copies data stored in the address range (e.g., address range 313 or 323) in the first cache 112 to the second cache 122 of the second processor 120. The act at block 230 may be performed by the first cache 112, for example, based on the address range 313 or 323 tagged by the first storage management module 111. In some embodiments, the first processor 110 may mirror data based on the size of data to be copied. Such embodiments will be described below in detail in conjunction with FIGS. 7 and 8.

In the example as shown in FIG. 3A, the metadata is continuously stored in the first cache 112, in particular, in the page 310. In such an example, the data copied to the second cache 112 only includes the metadata written at block 210. In the example as shown in FIG. 3B, the metadata is discontinuously stored in the first cache 112, in particular, in the page 320. In such an example, the data copied to the second cache 122 includes the metadata written at block 210 and other data, stored in the address range 323, which is different from the metadata.

In embodiments of the present disclosure, when handling a write request for internal cache (write of metadata), only data stored in an address range where the metadata is changed is mirrored to the peer processor, rather than the whole cache page being mirrored to the peer processor. In this way, the data transmission volume between the two processors is reduced, and thus the transmission time and the response time to the write request are reduced and the input/output (IO) performance is improved. In addition, the reduction of the data transmission volume also reduces the transmission workload of the internal communication interface (e.g. CMI) in the dual controller storage system. Therefore, more user data may be mirrored with the same capacity of the internal communication interface, and the overall performance of the storage system is improved.

As mentioned above, in some embodiments, transactional write may be supported to prevent data from being destroyed by incomplete writing. The transactional write means that when writing data (e.g., metadata) to a cache page, either all of the data is written successfully or none of the data is written; successful write of partial data is not allowed.

Figure 4:
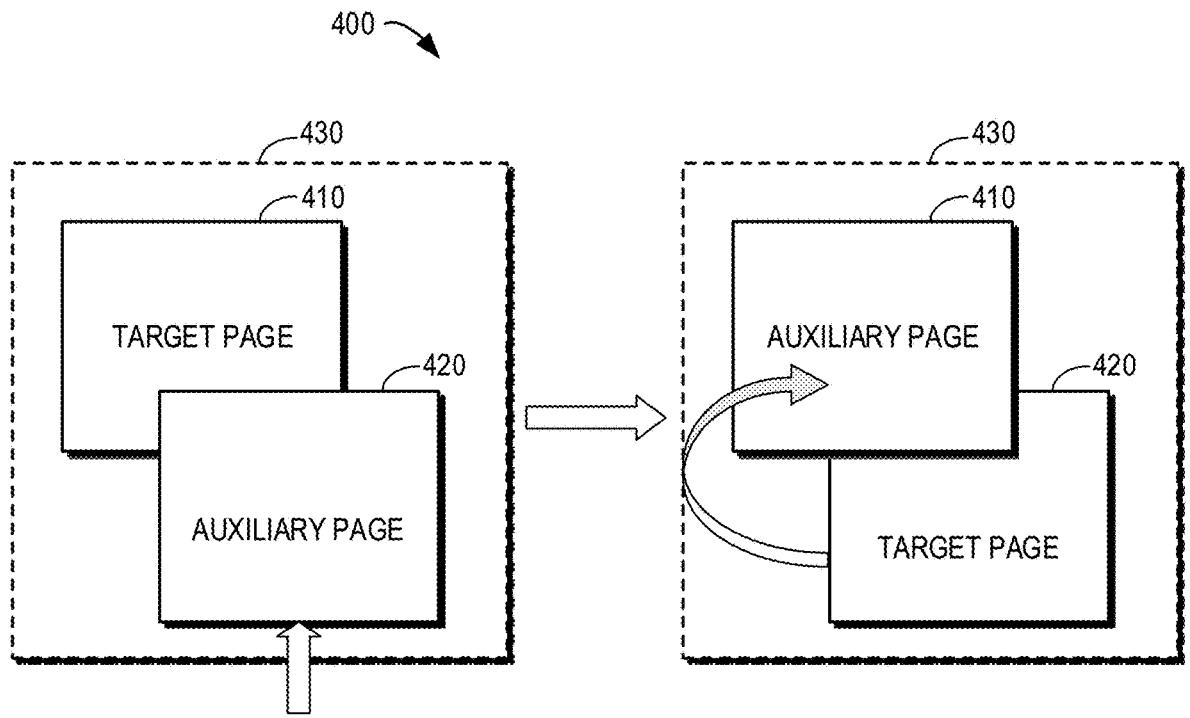
FIG. 4 shows a schematic diagram of a transactional write according to some embodiments of the present disclosure.

FIG. 4 shows a schematic diagram 400 of transactional write according to some embodiments of the present disclosure. In order to implement transactional write, the concept of cache page is introduced here. As shown in FIG. 4, there are two physical pages 410 and 420 for one transactional page 430, wherein one of two physical pages is a target page 410 (also referred to as an original page) and the other is an auxiliary page 420 (also referred to as a current page). The target page 410 includes historical metadata associated with the metadata to be written. For example, if the metadata to be written indicates the allocation of a certain disk slice, then the historical metadata indicates the current allocation of the disk slice. The auxiliary page 420 is allocated in association with the target page 410 for modifying data stored in the target page 410.

The first processor 110 may determine the target page 410 and the auxiliary page 420 in the first cache and write the metadata to the auxiliary page 420. For example, the target page 410 may be determined by the first cache 112 based on an internal write request received from the first storage management module 111, and the auxiliary page 420 may be dynamically allocated by the first cache 112. The first cache 112 may indicate information on the target page 410 and the auxiliary page 420 to the first storage management module 111, so that the first storage management module 111 may write the metadata to the first cache 112.

Figure 5:
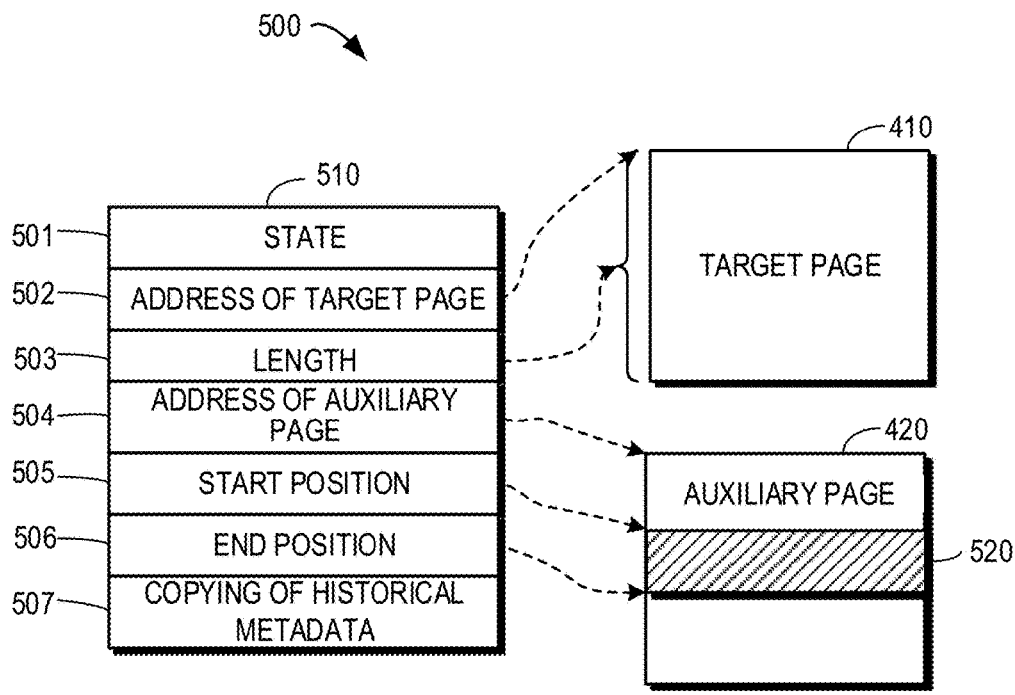
FIG. 5 shows a schematic diagram of a page information list according to some embodiments of the present disclosure.

FIG. 5 shows a schematic diagram 500 of a page information list 510 according to some embodiments of the present disclosure. In the conventional solution mentioned above, a page information list (may also become a scatter/gather list) provided by the cache to the storage management module only includes two elements, i.e., an address and a length of a page to be written. In contrast, the page information list 510 according to some embodiments of the present disclosure is extended. In the list 510, the elements 501-503 may indicate a state, an address and a length of the target page 410 respectively, and the element 504 may indicate an address of the auxiliary page 420. The state of the target page 410 may be of different predefined values to indicate the target page 410 is whether invalid, dirty or clean (see above). It should be understood that the auxiliary page 420 and the target page 410 have the same length, so the length of the auxiliary page 420 does not need to be indicated. The elements 501-504 in the list 510 may be filled by the first cache 112 and the list 510 may be sent to the first storage management module 111.

Still referring to FIG. 4, after receiving the list 510, the first storage management module 111 may determine the target page 410 and the auxiliary page 420 and write the changed metadata to the auxiliary page 420. The first storage management module 111 or the first cache 112 may further copy unchanged data from the target page 410 to the auxiliary page 420.

After the changed data is successfully written and mirrored to the second processor 120, the two physical pages may be swapped. That is, the physical page 420 turns into the target page associated with the transactional page 430, and the physical page 410 turns into the auxiliary page associated with the transactional page 430. It should be understood that since the auxiliary page is dynamically allocated, after the swap, the physical page 410 may be used as the auxiliary page for another transactional page. When data in the page 420 need to be modified, another physical page may be allocated as the auxiliary page for the transactional page 430.

When the metadata is not successfully written, data already written to the auxiliary page 420 may be discarded for rolling back. If data is written to multiple cache pages in one writing operation, the auxiliary pages are swapped with the target pages after all metadata has been written to all the auxiliary pages.

Figure 6:
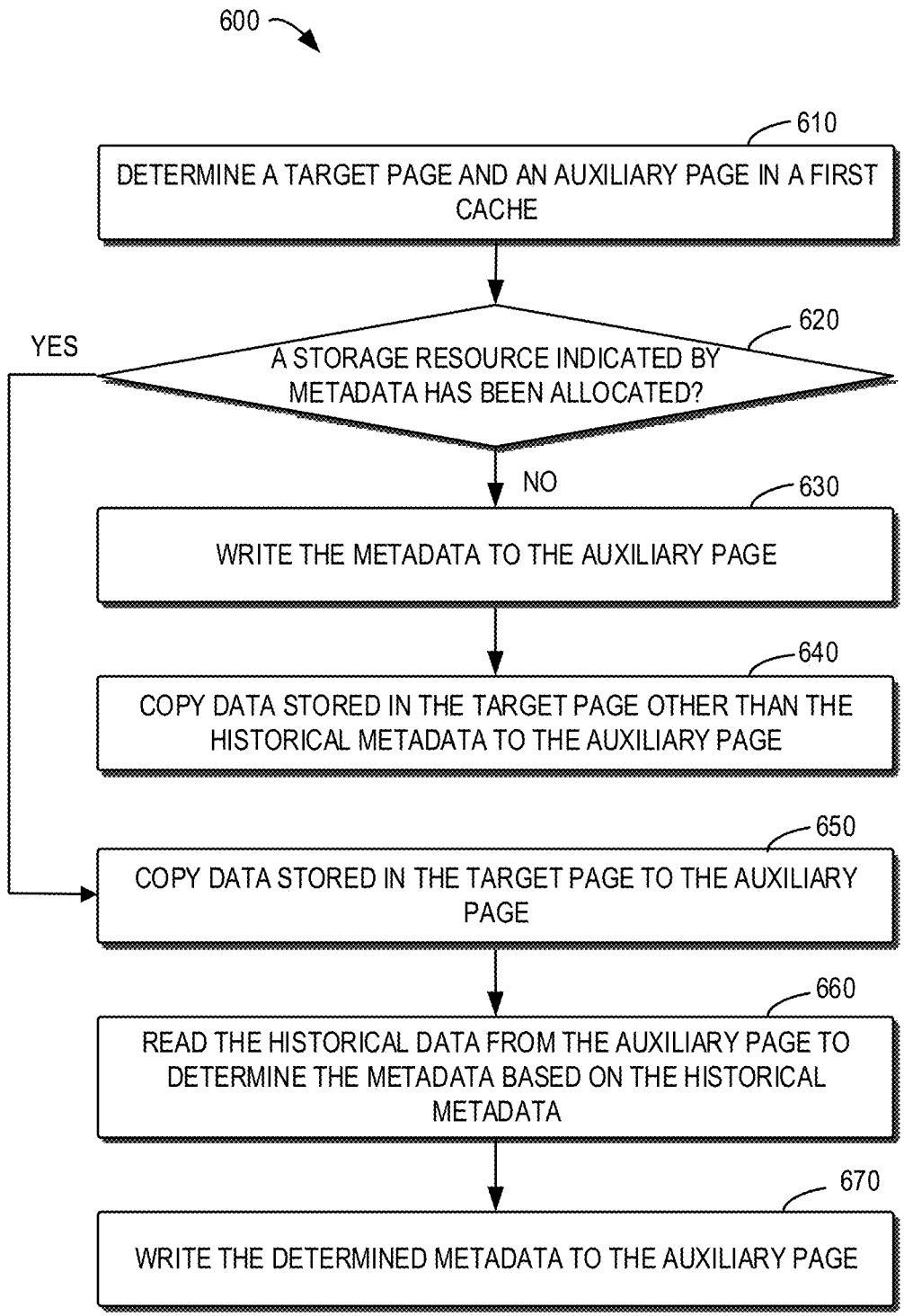
FIG. 6 shows a schematic diagram of a process of writing metadata to a first cache according to some embodiments of the present disclosure.

The first processor 110 may further write the metadata to the first cache 112 based on the storage resource indicated by the metadata to be written. FIG. 6 shows a schematic diagram of a process 600 of writing metadata to the first cache 112 according to some embodiments of the present disclosure. For the sake of discussion, the process 600 is described in conjunction with FIGS. 1 and 5. In such an example, the process 600 may be implemented at the first processor 110, and some steps of the process 600 may be performed by the first storage management module 111 while others may be performed by the first cache 112. The process 600 may be considered as a specific implementation of block 210 in FIG. 2.

At block 610, the first processor 110 determines the target page 410 and the auxiliary page 420 in the first cache 112, as described above with reference to FIGS. 4 and 5. At block 620, the first processor 110 determines whether the storage resource indicated by the metadata to be written has been allocated. For example, the first processor 110 may determine whether a disk slice indicated by the metadata to be written is allocated for storage of user data. Acts at the block 620 may be performed at the first storage management module 111.

If it is determined at block 620 that the storage resource indicated by the metadata has not yet been allocated, then the first processor 110 may write the metadata in a direct write manner, and the process 600 proceeds to block 630. At block 630, the first processor 110 (e.g., the first storage management module 111) writes the metadata to the auxiliary page 420. It should be understood that the position of the written metadata in the auxiliary page 420 is same as the position of the historical metadata, corresponding to the metadata, in the target page 410. With reference to FIG. 5, the metadata may be written to an address range 520 in the auxiliary page 420. The address range 520 may include continuously written metadata, such as the address range 313 as shown in FIG. 3. The address range 520 may also include discontinuously written metadata, such as the address range 323 as shown in FIG. 3.

At block 640, the first processor 110 copies data stored in the target page 410 other than the historical metadata (corresponding to the written metadata) to the auxiliary page 420. As such, the auxiliary page 420 will include changed metadata and the unchanged metadata in the target page 410. In some implementations, acts at blocks 630 and 640 may be performed by the first storage management module 111.

In other implementations, the act(s) at block 630 may be performed by the first storage management module 111, while the act(s) at block 640 may be performed by the first cache 112. In such implementations, the first storage management module 111 may set the elements 505-507 in the page information list 510 to indicate writing of the metadata and copying of the historical metadata to the first cache 112.

The first storage management module 111 may set the elements 504-506 to indicate to the first cache 112 the address range 520 of the written metadata in the auxiliary page 420. The first storage management module 111 may further set the element 507 as a predetermined value to indicate to the first cache 112 that related data in the target page 410 has not yet been copied to the auxiliary page 420. In this way, when receiving the list 510 returned by the first storage management module 111, the first cache 112 may determine, based on the value of the element 507, whether to copy original data in the target page 410 to the auxiliary page 420 or not. In the case where the original data has not been copied, the first cache 112 may at block 640 copy data stored in the target page 410 other than the historical metadata to the auxiliary page 420.

If it is determined at block 620 that the storage resource indicated by the metadata has been allocated, then the first processor 110 may write the metadata in a read-modify-write manner, and the process 600 proceeds to block 650. At block 650, the first processor 110 copies data stored in the target page 410 to the auxiliary page 420. At block 660, the first processor 110 reads from the auxiliary page 420 historical metadata associated with the metadata to be written, so as to determine the metadata to be written based on the historical metadata. For example, the first processor 110 may calculate new metadata based on the historical metadata according to a predefined rule. At block 670, the first processor 110 writes the determined metadata to the auxiliary page 420. It should be understood that the position of the written metadata in the auxiliary page 420 is the same as the position of the historical metadata in the target page 410, which corresponds to the metadata.

In a specific implementation, all of blocks 650-670 may be performed at the first storage management module 111. Accordingly, the first storage management module 111 may set a value of the element 507 in the list 510 to indicate to the first cache 112 that related data in the target page 410 has been copied to the auxiliary page 420. As such, when receiving the returned list 510, the first cache 112 will not copy data in the target page 410.

In some embodiments, acts at blocks 650-670 may be replaced by other acts. If it is determined at block 620 that the storage resource indicated by the metadata has been allocated, then the first processor 110 may read from the target page 410 historical metadata associated with the metadata to be written, so as to determine the metadata to be written based on the historical metadata. Then, the first processor 110 may write the determined metadata to the auxiliary page 420. As mentioned above, the position of the written metadata in the auxiliary page 420 is the same as position of the historical metadata in the target page 410, which correspond to the metadata. Next, the first processor 110 may copy data stored in the target page 410 other than the historical metadata to the auxiliary page 420.

All of the above acts may be performed at the first storage management module 111. Accordingly, the first storage management module 111 may set the value of the element 507 in the list 510 to indicate to the first cache 112 that related data in the target page 410 has been copied to the auxiliary page 420.

Through the process 600, the auxiliary page 420 includes the changed metadata and unchanged data in the target page 410. After data in the address range 520 has been copied to the second processor 120, the first processor 110 (e.g., first cache 112) may swap the target page 410 with the auxiliary page 420.

In such embodiments, destroy of data caused by incomplete writing may be avoided by introducing the concept of transactional page composed of two physical pages. In this way, the security of data writing is improved.

As mentioned above, in some embodiments, the first processor 110 may mirror data to the second processor 120 based on the size of data (data in the address range 313, 323 or 520) to be transmitted. In the case where the state of the target page 410 is invalid (as indicated by the element 501 in the list 510) or the target page 410 is not mirrored previously, there is no corresponding original data in the second processor 110. Therefore, the first processor 110 may mirror data in the whole page to the second processor 120 in DMA manner as in the traditional solution. When the volume of data to be transmitted is relatively small, the first processor 110 may transmit the data to a buffer of the second processor; when the volume of data to be transmitted is larger, the first processor 110 may directly transmit the data to the second cache 122 of the second processor 120. Such implementation is described below in detail in conjunction with FIGS. 7 and 8.

Figure 7:
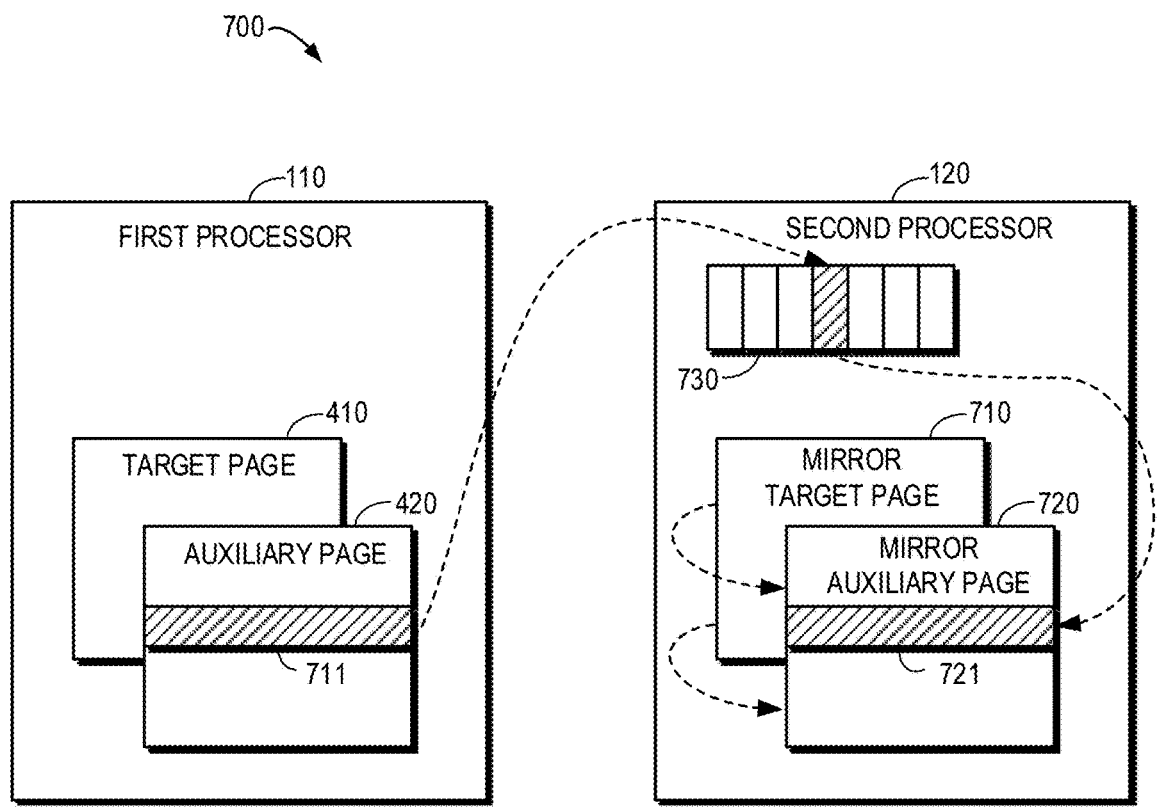
FIG. 7 shows a schematic diagram of copying data according to some embodiments of the present disclosure.
Figure 8:
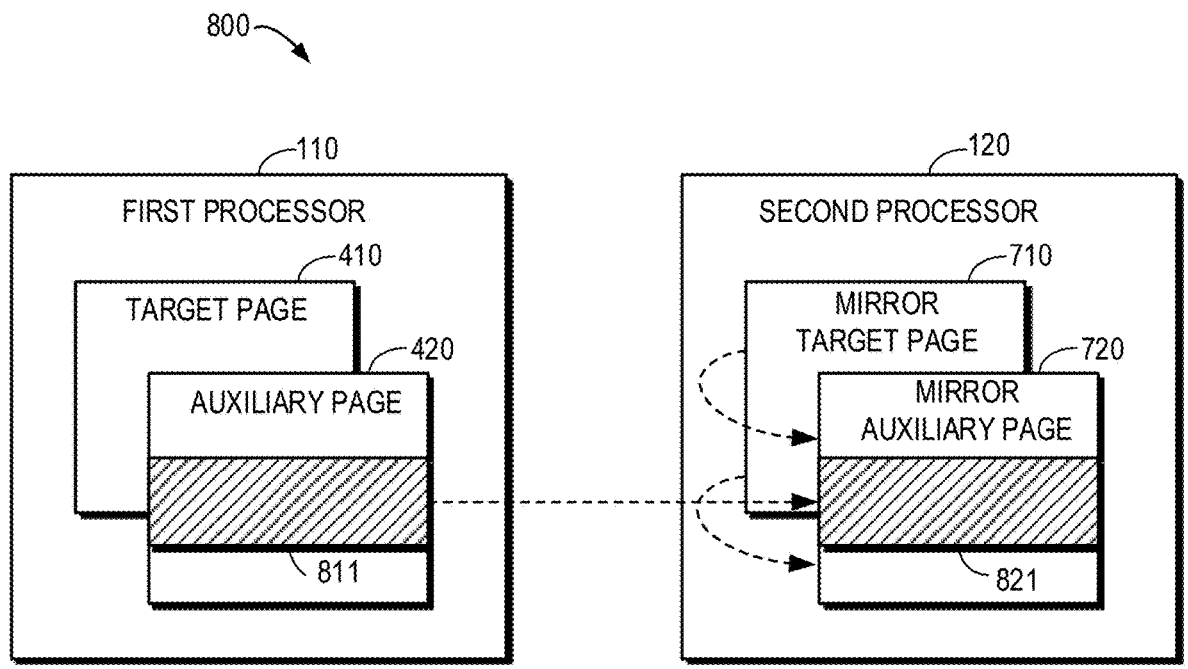
FIG. 8 shows a schematic diagram of copying data according to some other embodiments of the present disclosure.

FIG. 7 shows a schematic diagram 700 of copying data according to some embodiments of the present disclosure, wherein data in an address range 711 is to be mirrored to the second processor 120. FIG. 8 shows a schematic diagram 800 of copying data according to some other embodiments of the present disclosure, wherein data in an address range 811 is to be mirrored to the second processor 120.

The first processor 110 (e.g., first cache 112) may determine whether the size of the data to be transmitted exceeds a threshold size. For example, the first processor 110 may determine the size of the data stored in the address range 711 or 811 exceeds the threshold size. As shown in FIG. 7, the size of the data in the address range 711 is below the threshold size. In this case, the first processor 110 may transmit the data to a buffer 730 (e.g., receiving ring buffer) of the second processor 120 and send to the second processor a message indicating that the data is transmitted to the buffer 730, so that the second processor 120 copies the data from the buffer 730 to the second cache 122, e.g., to a page 720. In addition, the first processor 110 may further send the address range 711 to the second processor 120, so that the second processor 120 can store in a mirror manner the data in the address range 711.

An advantage of such an approach is to save DMA resources, so that more data can be transmitted in one DMA operation. In addition, since only a few bytes of delta data is copied for each internal write request, the CPU workload increased due to the copy of delta data is negligible.

When the volume of the data to be transmitted is large, it is inappropriate to transmit the data with the buffer. The copy of large data may occupy plenty of CPU resources, and at the same time too much usage of the (ring) buffer may also decrease the performance of the internal communication interface 130 (e.g., CMI). As shown in FIG. 8, the size of the data in the address range 811 exceeds the threshold size. In this case, the first processor 110 may transmit the data to the second cache 122 (e.g., via DMA) and send to the second processor 120 a message indicating that the data is directly transmitted to the second cache 122. In addition, the first processor 110 may further send the address range 811 to the second processor 120, so that the second processor 120 can store in a mirror manner the data in the address range 811.

In the examples as shown in FIGS. 7 and 8, information on the target page 410 may also be sent to the second processor 120, so that the second processor 120 can find out a mirror page of the target page 410 in the second processor 120, e.g., a mirror target page 710. It should be understood that although the mirror of data is shown in FIGS. 7 and 8 by taking a transactional write as an example, this is merely illustrative, and the data mirroring method described in the present disclosure is also applicable to non-transactional writes.

The threshold size may be determined based on the capabilities of the first processor 110, the second processor 120 and the internal communication interface 130. Therefore, in such embodiments, using different data transmission paths based on the size of data to be mirrored may better balance the use of different resources (such as CPU, internal communication interface), which is beneficial to improve the overall performance of the storage system.

Figure 9:
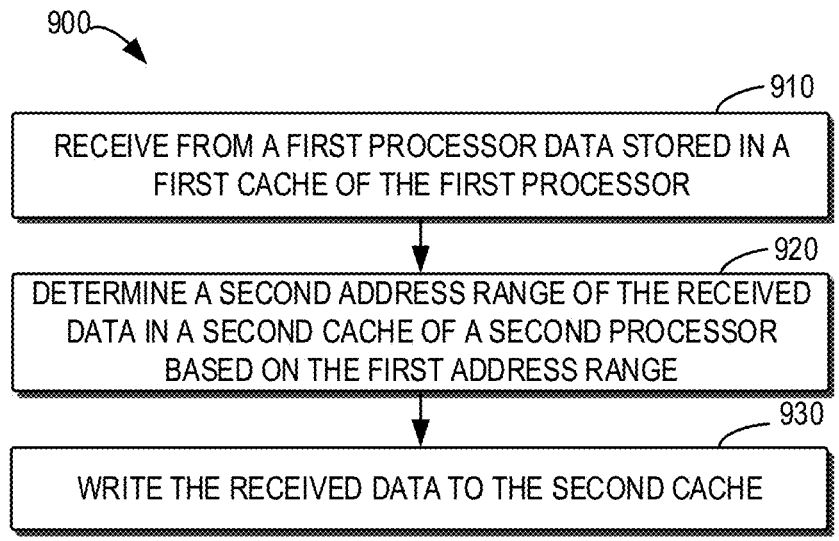
FIG. 9 shows a flowchart of a process of mirroring metadata according to some embodiments of the present disclosure.

Description has been given to the process where the first processor 110 mirrors the changed metadata instead of the whole cache page to the second processor 120. With reference to FIGS. 7-9, description is given below to the process where the second processor 120 receives data to be mirrored and write the data to the second cache 122 thereof.

FIG. 9 shows a flowchart of a process 900 of mirroring metadata according to some embodiments of the present disclosure. The process 900 may be implemented by a storage processor/controller of a storage system, in particular by a cache module in the storage processor. For the sake of discussion, the process 900 is described in conjunction with FIG. 1. In such embodiments, the process 900 may be implemented at the second processor 120.

At block 910, the second processor 120 receives from the first processor 110 data stored in the first cache 112 of the first processor 110. The received data is stored in a first address range of metadata in the first cache 112, e.g., the address range 313 or 323. The metadata indicates allocation of a storage resource to user data, discussed above.

In some embodiments, the second processor 120 may receive from the first processor 110 a message indicating that the data is transmitted to a buffer (e.g., buffer 730) of the second processor 120, and the second processor 120 may store in the buffer the data from the first processor 110.

In some embodiments, the second processor 120 may receive from the first processor 110 a message indicating that data is directly transmitted to the second cache 122, and the second processor 120 may receive data directly from the first cache 112. For example, the second cache 122 of the second processor 120 may receive data to be mirrored from the first cache 112 in the DMA manner.

At block 920, the second processor 120 determines a second address range of the received data in the second cache 122 of the second processor 120 based on the first address range of the metadata in the first cache 112. As described above, the first processor 110 may send to the second processor 120 the first address range of the metadata in the first cache 112. Since data in the first cache 112 and the second cache 122 are mirrors of each other, the second processor 120 may determine the second address range of the received data in the second cache 122 based on the first address range, such as the address ranges 313, 323, 520, etc.

At block 930, the second processor 120 writes the received data to the second cache 122 based on the first address range. As an example, if the metadata is stored in the page 310 as shown in FIG. 3A, then the second processor 120 may determine a mirror page of the page 310 in the second cache 122 and write the received data to an address range, which corresponds to the address range 313, in the mirror page. As another example, if the metadata is stored in the page 320 as shown in FIG. 3B, then the second processor 120 may determine a mirror page of the page 320 in the second cache 122 and write the received data to an address range, which corresponds to the address range 323, in the mirror page.

In some embodiments, to avoid the risk caused by incomplete writing of data, a transactional write may also be implemented in the second processor 120. Such embodiments are described below with reference to FIGS. 7 and 8. The second processor 120 may determine a mirror target page 710 and a mirror auxiliary page 720 in the second cache 122. Mirror data associated with the received data is stored in the mirror target page 710, e.g., mirror data corresponding to data stored in the address range 811 is stored in a corresponding address range of the mirror target page 710. In other words, the mirror target page 710 is a mirror page of the target page 410 in the second cache 122. The mirror auxiliary page 720 is allocated in association with the mirror target page 710 for modifying data stored in the mirror target page 710.

The second processor 120 may write the received data to the mirror auxiliary page 720. It should be understood that the address range 721 or 821 of the received data in the mirror auxiliary page 720 corresponds to the address range 711 or 811 in the auxiliary page 420. Additionally, the second processor 120 may copy data stored in the mirror target page 710 other than the mirror data to the mirror auxiliary page 720.

In the example of FIG. 7, the size of the data stored in the address range 711 is below the threshold size. In this case, the data stored in the address range 711 may be transmitted to the buffer 730 of the second processor 120. The second processor 120 may write the data temporarily stored in the buffer 730 to the corresponding address range 721 in the mirror auxiliary page 720. The second processor 120 may further copy, to the corresponding address in the mirror auxiliary page 720, data stored in the mirror target page 710 other than the mirror data corresponding to data in the address range 711. In other words, the second processor 120 may copy the unchanged data in the mirror target page 710 to the mirror auxiliary page 720.

In such an example, when mirroring a small amount of changed data, receiving data to be mirrored with a buffer may improve the system performance. Since with this method, more data can be transmitted in one DMA operation, the DMA resources of the internal communication interface (CMI) can be saved. Moreover, since only a few data is copied, the increase of CPU usage is negligible.

In the example of FIG. 8, the size of the data stored in the address range 811 exceeds the threshold size. In this case, the data stored in the address range 811 may be directly transmitted to the second cache 122 of the second processor 120 in the DMA manner. The second processor 120 may write the received data to the corresponding address range 821 in the mirror auxiliary page 720. The second processor 120 may further copy, to the corresponding address in the mirror auxiliary page 720, data stored in the mirror target page 710 other than the mirror data corresponding to data in the address range 811. In other words, the second processor 120 may copy unchanged data in the mirror target page 710 to the mirror auxiliary page 720.

In the examples of FIGS. 7 and 8, after copying the unchanged data, the mirror auxiliary page 720 turns into the mirror page of the auxiliary page 420. Accordingly, the mirror auxiliary page 720 may be swapped with the mirror target page 710.

Figure 10:
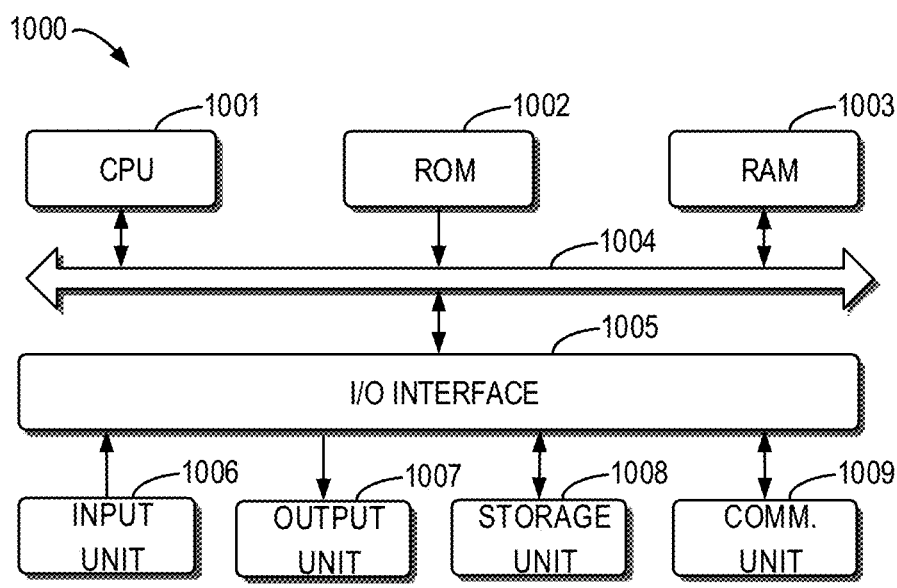
FIG. 10 shows a block diagram of an example device that can be used to implement embodiments of the present disclosure.

FIG. 10 is a schematic block diagram of an example device 1000 that can be used to implement embodiments of the present disclosure. As illustrated, the device 1000 includes a central processing unit (CPU) 1001 which can perform various suitable acts and processing based on the computer program instructions stored in a read-only memory (ROM) 1002 or computer program instructions loaded into a random access memory (RAM) 1003 from a storage unit 1008. The RAM 1003 also stores various types of programs and data required by operating the storage device 1000. CPU 1001, ROM 1002 and RAM 1003 are connected to each other via a bus 1004 to which an input/output (I/O) interface 1005 is also connected.

Various components in the device 1000 are connected to the I/O interface 1005, including: an input unit 1006, such as a keyboard, mouse and the like; an output unit 1007, such as a variety of types of displays, loudspeakers and the like; a storage unit 1008, such as a magnetic disk, optical disk and the like; and a communication unit 1009, such as a network card, modem, wireless communication transceiver and the like. The communication unit 1009 enables the device 1000 to exchange information/data with other devices via a computer network such as Internet and/or a variety of telecommunication networks.

The processing unit 1001 performs various methods and processes as described above, for example, any of the processes 200, 600 and 900. For example, in some embodiments, any of the processes 200, 600 and 900 may be implemented as a computer software program or computer program product, which is tangibly included in a machine-readable medium, such as the storage unit 1008. In some embodiments, the computer program can be partially or fully loaded and/or installed to the device 1000 via ROM 1002 and/or the communication unit 1009. When the computer program is loaded to RAM 1003 and executed by CPU 1001, one or more steps of any of the processes 200, 600 and 900 described above are implemented. Alternatively, in other embodiments, CPU 1001 may be configured to implement any of the processes 200, 600 and 900 in any other suitable manner (for example, by means of a firmware).

According to some embodiments of the present disclosure, there is provided a computer readable medium. The computer readable medium is stored with a computer program which, when executed by a processor, implements the method according to the present disclosure.

Those skilled in the art would understand that various steps of the method of the disclosure above may be implemented via a general-purpose computing device, which may be integrated on a single computing device or distributed over a network composed of a plurality of computing devices. Optionally, they may be implemented using program code executable by the computing device, such that they may be stored in a storage device and executed by the computing device; or they may be made into respective integrated circuit modules or a plurality of modules or steps therein may be made into a single integrated circuit module for implementation. In this way, the present disclosure is not limited to any specific combination of hardware and software.

It would be appreciated that although several means or sub-means (e.g., specialized circuitry) of the apparatus have been mentioned in detailed description above, such partition is only example but not limitation. Actually, according to the embodiments of the present disclosure, features and functions of two or more apparatuses described above may be instantiated in one apparatus. In turn, features and functions of one apparatus described above may be further partitioned to be instantiated by various apparatuses.

What have been mentioned above are only some optional embodiments of the present disclosure and are not limiting the present disclosure. For those skilled in the art, the present disclosure may have various alternations and changes. Any modifications, equivalents and improvements made within the spirits and principles of the present disclosure should be included within the scope of the present disclosure.

We claim:

1. A method for data storage, comprising:
   writing metadata to a first cache of a first processor, the metadata indicating allocation of a storage resource to received user data, wherein the storage resource is located in at least one storage disk communicably connected to the first processor, and wherein the metadata written to the first cache indicates a user logical unit number to which a disk slice of the storage disk is allocated;
   determining an address range of the metadata in the first cache; and
   copying only data stored in the address range in the first cache to a second cache of a second processor, wherein copying the data stored in the address range to the second cache comprises:
      determining whether a size of the data exceeds a threshold size; and
      in response to the size of the data being below the threshold size:
         transmitting the data to a ring buffer of the second processor, and
         sending to the second processor a message indicating that the data was transmitted to the ring buffer, wherein receipt of the message by the second processor causes the second processor to copy the data from the ring buffer to the second cache.

2. The method of claim 1, wherein the metadata is discontinuously stored in the first cache, and the data copied to the second cache comprises the metadata and other data, stored in the address range, which is different from the metadata.

3. The method of claim 1, wherein writing the metadata to the first cache comprises:
   determining a target page and an auxiliary page in the first cache, the target page comprising historical metadata associated with the metadata, and the auxiliary page being allocated in association with the target page for modifying data stored in the target page; and
   writing the metadata to the auxiliary page.

4. The method of claim 3, wherein writing the metadata to the auxiliary page comprises:
   determining whether a storage resource indicated by the metadata has been allocated;
   in response to the storage resource having not been allocated, writing the metadata to the auxiliary page; and
   copying data stored in the target page other than the historical metadata to the auxiliary page.

5. The method of claim 4, further comprising:
   in response to the storage resource having been allocated, copying data stored in the target page to the auxiliary page;
   reading the historical metadata from the auxiliary page to determine the metadata based on the historical metadata; and
   writing the determined metadata to the auxiliary page.

6. The method of claim 4, further comprising:
   in response to the storage resource having been allocated, reading the historical metadata from the target page to determine the metadata based on the historical metadata;
   writing the determined metadata to the auxiliary page; and
   copying data stored in the target page other than the historical metadata to the auxiliary page.

7. The method of claim 1, further comprising:
   in response to the size of the data exceeding the threshold size,
   transmitting the data to the second cache; and
   sending to the second processor a message indicating that the data is directly transmitted to the second cache.

8. The method of claim 1, wherein the storage disk is communicably connected to the first processor through a backend bus.

9. A method for data storage, comprising:
   receiving, from a first processor, data stored in a first cache of the first processor, the received data being stored within a first address range of metadata in the first cache, the metadata indicating allocation of a storage resource to received user data, wherein the storage resource is located in at least one storage disk communicably connected to the first processor, wherein the metadata written to the first cache indicates a user logical unit number to which a disk slice of the storage disk is allocated, and wherein receiving the data from the first processor comprises:
      storing the received data into a ring buffer in a second processor, and
      receiving a message from the first processor indicating that the data was transmitted to the ring buffer in the second processor, wherein receipt of the message causes the second processor to copy the data from the ring buffer to a second cache of the second processor;
   determining a second address range of the received data in the second cache of the second processor based on the first address range; and
   writing the received data to the second cache based on the second address range.

10. The method of claim 9, wherein the metadata is discontinuously stored in the first cache, and the received data comprises the metadata and other data, stored in the address range, which is different from the metadata.

11. The method of claim 9, wherein receiving from the first processor the data comprises:
    receiving a message indicating that the data is directly transmitted to the second cache; and
    receiving the data from the first cache.

12. The method of claim 9, wherein writing the received data to the second cache comprises:
    determining a mirror target page and a mirror auxiliary page in the second cache, mirror data associated with the received data being stored in the mirror target page, and the mirror auxiliary page being allocated in association with the mirror target page for modifying data stored in the mirror target page; and
    writing the received data to the mirror auxiliary page.

13. The method of claim 12, further comprising:
    copying data stored in the mirror target page other than the mirror data to the mirror auxiliary page.

14. An electronic device, comprising:
    a processor; and
    a memory coupled to the processor, the memory having instructions stored therein, the instructions, when executed by the processor, causing the electronic device to perform acts comprising:
       writing metadata to a first cache of a first processor, the metadata indicating allocation of a storage resource to received user data, wherein the storage resource is located in at least one storage disk communicably connected to the first processor, and wherein the metadata written to the first cache indicates a user logical unit number to which a disk slice of the storage disk is allocated;
       determining an address range of the metadata in the first cache; and
       copying only data stored in the address range in the first cache to a second cache of a second processor, wherein copying the data stored in the address range to the second cache comprises:
          determining whether a size of the data exceeds a threshold size; and
          in response to the size of the data being below the threshold size:
             transmitting the data to a ring buffer of the second processor, and
             sending to the second processor a message indicating that the data was transmitted to the ring buffer, wherein receipt of the message by the second processor causes the second processor to copy the data from the ring buffer to the second cache.

15. The electronic device of claim 14, wherein the metadata is discontinuously stored in the first cache, and the data copied to the second cache comprises the metadata and other data, stored in the address range, which is different from the metadata.

16. The electronic device of claim 14, wherein writing the metadata to the first cache comprises:
    determining a target page and an auxiliary page in the first cache, the target page comprising historical metadata associated with the metadata, and the auxiliary page being allocated in association with the target page for modifying data stored in the target page; and
    writing the metadata to the auxiliary page.

17. The electronic device of claim 16, wherein writing the metadata to the auxiliary page comprises:
    determining whether a storage resource indicated by the metadata has been allocated;

in response to the storage resource having not been allocated, writing the metadata to the auxiliary page; and copying data stored in the target page other than the historical metadata to the auxiliary page.

18. The electronic device of claim 17, wherein the acts further comprise:

in response to the storage resource having been allocated, copying data stored in the target page to the auxiliary page;

reading the historical metadata from the auxiliary page to determine the metadata based on the historical metadata; and writing the determined metadata to the auxiliary page.

19. The electronic device of claim 17, wherein the acts further comprise:

in response to the storage resource having been allocated, reading the historical metadata from the target page to determine the metadata based on the historical metadata;

writing the determined metadata to the auxiliary page; and copying data stored in the target page other than the historical metadata to the auxiliary page.

20. The electronic device of claim 14, wherein the acts further comprise:

in response to the size of the data exceeding the threshold size,
transmitting the data to the second cache; and
sending to the second processor a message indicating that the data is directly transmitted to the second cache.

21. An electronic device, comprising:
a processor; and
a memory coupled to the processor, the memory having instructions stored therein, the instructions, when executed by the processor, causing the electronic device to perform acts comprising:
receiving, from a first processor, data stored in a first cache of the first processor, the received data being stored within a first address range of metadata in the first cache, the metadata indicating allocation of a storage resource to received user data, wherein the storage resource is located in at least one storage disk communicably connected to the first processor, wherein the metadata written to the first cache indicates a user logical unit number to which a disk slice of the storage disk is allocated, and wherein receiving the data from the first processor comprises:
storing the received data into a ring buffer in a second processor, and
receiving a message from the first processor indicating that the data was transmitted to the ring buffer in the second processor, wherein receipt of the message causes the second processor to copy the data from the ring buffer to a second cache of the second processor;
determining a second address range of the received data in the second cache of the second processor based on the first address range; and
writing the received data to the second cache based on the second address range.

22. The electronic device of claim 21, wherein the metadata is discontinuously stored in the first cache, and the received data comprises the metadata and other data, stored in the address range, which is different from the metadata.

23. The electronic device of claim 21, wherein receiving from the first processor the data comprises:

receiving a message indicating that the data is directly transmitted to the second cache; and
receiving the data from the first cache.

24. The electronic device of claim 21, wherein writing the received data to the second cache comprises:
determining a mirror target page and a mirror auxiliary page in the second cache, mirror data associated with the received data being stored in the mirror target page, and the mirror auxiliary page being allocated in association with the mirror target page for modifying data stored in the mirror target page; and
writing the received data to the mirror auxiliary page.

25. The electronic device of claim 24, wherein the acts further comprise: copying data stored in the mirror target page other than the mirror data to the mirror auxiliary page.

26. A computer program product having a non-transitory computer readable medium which stores a set of instructions to perform data storage; the set of instructions, when carried out by computerized circuitry, causing the computerized circuitry to perform a method of:
writing metadata to a first cache of a first processor, the metadata indicating allocation of a storage resource to received user data, wherein the storage resource is located in at least one storage disk communicably connected to the first processor, and wherein the metadata written to the first cache indicates a user logical unit number to which a disk slice of the storage disk is allocated;
determining an address range of the metadata in the first cache; and
copying only data stored in the address range in the first cache to a second cache of a second processor, wherein copying the data stored in the address range to the second cache comprises:
determining whether a size of the data exceeds a threshold size; and
in response to the size of the data being below the threshold size:
transmitting the data to a ring buffer of the second processor, and
sending to the second processor a message indicating that the data was transmitted to the ring buffer, wherein receipt of the message by the second processor causes the second processor to copy the data from the ring buffer to the second cache.

27. A computer program product having a non-transitory computer readable medium which stores a set of instructions to perform data storage; the set of instructions, when carried out by computerized circuitry, causing the computerized circuitry to perform a method of:
receiving from a first processor data stored in a first cache of the first processor, the received data being stored within a first address range of metadata in the first cache, the metadata indicating allocation of a storage resource to received user data, wherein the storage resource is located in at least one storage disk communicably connected to the first processor, wherein the metadata written to the first cache indicates a user logical unit number to which a disk slice of the storage disk is allocated, and wherein receiving the data from the first processor comprises:
storing the received data into a ring buffer in a second processor, and
receiving a message from the first processor indicating that the data was transmitted to the ring buffer in the second processor, wherein receipt of the message causes the second processor to copy the data from the ring buffer to a second cache of the second processor;

determining a second address range of the received data in the second cache of the second processor based on the first address range; and writing the received data to the second cache based on the second address range.

* * * * *